United States Patent
Mittal et al.

(10) Patent No.: US 12,382,287 B2
(45) Date of Patent: *Aug. 5, 2025

(54) ENCRYPTED FLOW OF SIM DATA BETWEEN REGIONS AND EDGE NETWORKS

(71) Applicant: MICROSOFT TECHNOLOGY LICENSING, LLC, Redmond, WA (US)

(72) Inventors: Prateek Mittal, Los Altos, CA (US); Richard John Whitehouse, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,595

(22) Filed: Apr. 5, 2024

(65) Prior Publication Data

US 2024/0251244 A1 Jul. 25, 2024

Related U.S. Application Data

(63) Continuation of application No. 17/733,831, filed on Apr. 29, 2022, now Pat. No. 11,991,520.

(51) Int. Cl.
*H04W 12/06* (2021.01)
*H04W 8/22* (2009.01)
(Continued)

(52) U.S. Cl.
CPC .......... *H04W 12/068* (2021.01); *H04W 8/22* (2013.01); *H04W 12/03* (2021.01); *H04W 12/0433* (2021.01)

(58) Field of Classification Search
CPC .... H04W 12/068; H04W 12/45; H04W 12/35
See application file for complete search history.

(56) References Cited

U.S. PATENT DOCUMENTS

| | | | |
|---|---|---|---|
| 6,934,391 B1 * | 8/2005 | Linkola | H04L 63/0853 713/168 |
| 11,991,520 B2 * | 5/2024 | Mittal | H04W 12/35 |

(Continued)

OTHER PUBLICATIONS

"International Search Report and Written Opinion Issued in PCT Application No. PCT/US2023/013366", Mailed Date: May 15, 2023, 13 pages. (Year: 2023).*

*Primary Examiner* — Ponnoreay Pich
(74) *Attorney, Agent, or Firm* — Han Gim; Newport IP, LLC

(57) ABSTRACT

A plurality of computing devices are provisioned configured to communicate on a mobile communications network operated, in part, by an edge computing network. The edge computing network is associated with a customer of a computing service provider. The edge computing network comprises computing and storage devices configured to extend computing resources of the computing service provider to the customer of the computing service provider. A selection is received of a SIM provider and a quantity of SIM profiles for enabling the plurality of computing devices to access the mobile communications network. SIM data corresponding to the quantity of SIM profiles is received. The SIM data is encrypted and received over an encrypted channel.

20 Claims, 6 Drawing Sheets

(51) Int. Cl.
*H04W 12/03* (2021.01)
*H04W 12/0433* (2021.01)

(56) References Cited

U.S. PATENT DOCUMENTS

| | | | |
|---|---|---|---|
| 2003/0070084 A1* | 4/2003 | Satomaa | H04L 63/20 726/22 |
| 2004/0015692 A1* | 1/2004 | Green | H04W 12/122 713/169 |
| 2006/0052085 A1* | 3/2006 | Gregrio Rodriguez | H04L 63/0853 455/411 |
| 2023/0354026 A1* | 11/2023 | Mittal | H04W 12/033 |

* cited by examiner

ENCRYPTED FLOW OF SIM DATA BETWEEN REGIONS AND EDGE NETWORKS

CROSS-REFERENCE TO RELATED APPLICATION

This application is a continuation of U.S. Pat. No. 11,991,520, filed Apr. 29, 2022, the content of which application is hereby expressly incorporated herein by reference in its entirety.

BACKGROUND

Service providers for communications devices generally require that the communications devices have the proper credentials to access and enable use of services. The credentials securely and uniquely identify a subscription or account with the service provider and enable the communications device to access and use the services associated with the subscription. When the communications device is a mobile communications device, the service provider may be called a mobile network operator (MNO), and the services may include, for example, mobile voice calling, text messaging, or Internet data service.

The credentials may reside in a secure container called a Universal Integrated Circuit Card (UICC) or "SIM card." The UICC may support the remote provisioning of credentials, in which case it may be called an eUICC or an eSIM. The credentials may be provisioned to the eUICC/eSIM when manufactured or may be provisioned to the eUICC/eSIM remotely while the eUICC/eSIM resides in the communications device. However, large scale deployments of such devices and provisioning those devices may be difficult and complex to implement.

It is with respect to these considerations and others that the disclosure made herein is presented.

SUMMARY

Communications devices typically require credentials that securely and uniquely identify a subscription or account to enable a communications device to access and use services on a network. Such communications devices may include mobile phones, IoT devices, PCs, or any other device that has a secure container for storing the credentials which may generally be referred to as a subscriber identification module (SIM). Such a device typically ships without SIM data and must be provided with valid SIM data in order to access an appropriate network.

However, large scale deployments of such devices may be difficult and complex to implement. For example, an enterprise may wish to deploy a private network with a large number of enterprise-provided communications devices at an enterprise site that communicate over a 5G network. In order to provide the desired connectivity, each of the devices must be provisioned with a SIM profile using provider-specific processes of the 5G service provider in order to access the 5G network. SIM data for the SIM profiles must be securely received from the SIM provider and securely stored and managed at the location of deployment. This may be a cumbersome and complex process that can greatly increase the cost and complexity of deployment.

The disclosed embodiments describe technologies for allowing a cloud service provider to facilitate the acquisition, deployment, and management of SIM data for customers of the cloud service provider. The disclosure includes systems that provide:

Secure transfer of SIM keys (e.g., Ki and OPc) between a cloud service provider and the customer's edge site.

Secure storage of the SIM keys at the cloud service provider region.

Secure storage of the SIM keys at the customer's edge (on premises).

In one example, an encrypted flow of SIM data between cloud service provider regions and the edge can allow an enterprise customer to efficiently deploy a private network in an industrial complex at the customer site. The customer site connects a plurality of IoT devices that have installed SIM cards and where the associated profiles are under the management and control of the customer and facilitated by the cloud service provider. An infrastructure layer is provided for the edge communication stack at the customer site that enables encrypted flow of SIM data via a 5G private multi-access edge compute (MEC). The customer site can include radio access network (RAN) units that connect the customer's devices to the 5G private MEC. The cloud service provider network enables encrypted flow of SIM data between regions and the private MEC and provides secure storage of the SIM data at these sites.

The techniques disclosed herein can improve security and privacy when provisioning mobile devices for an enterprise user. Furthermore, by providing a standardized method for more securely transferring SIM data, the various systems can operate more efficiently by avoiding repeated and inefficient attempts to identify devices and manage SIM data, thus saving the use of memory, processing resources, network resources, etc. Other technical effects other than those mentioned herein can also be realized from implementations of the technologies disclosed herein.

This Summary is provided to introduce a selection of concepts in a simplified form that are further described below in the Detailed Description. This Summary is not intended to identify all of the key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale Like numerals represent like elements throughout the several figures.

DETAILED DESCRIPTION OF ILLUSTRATIVE EMBODIMENTS

Figure 1:
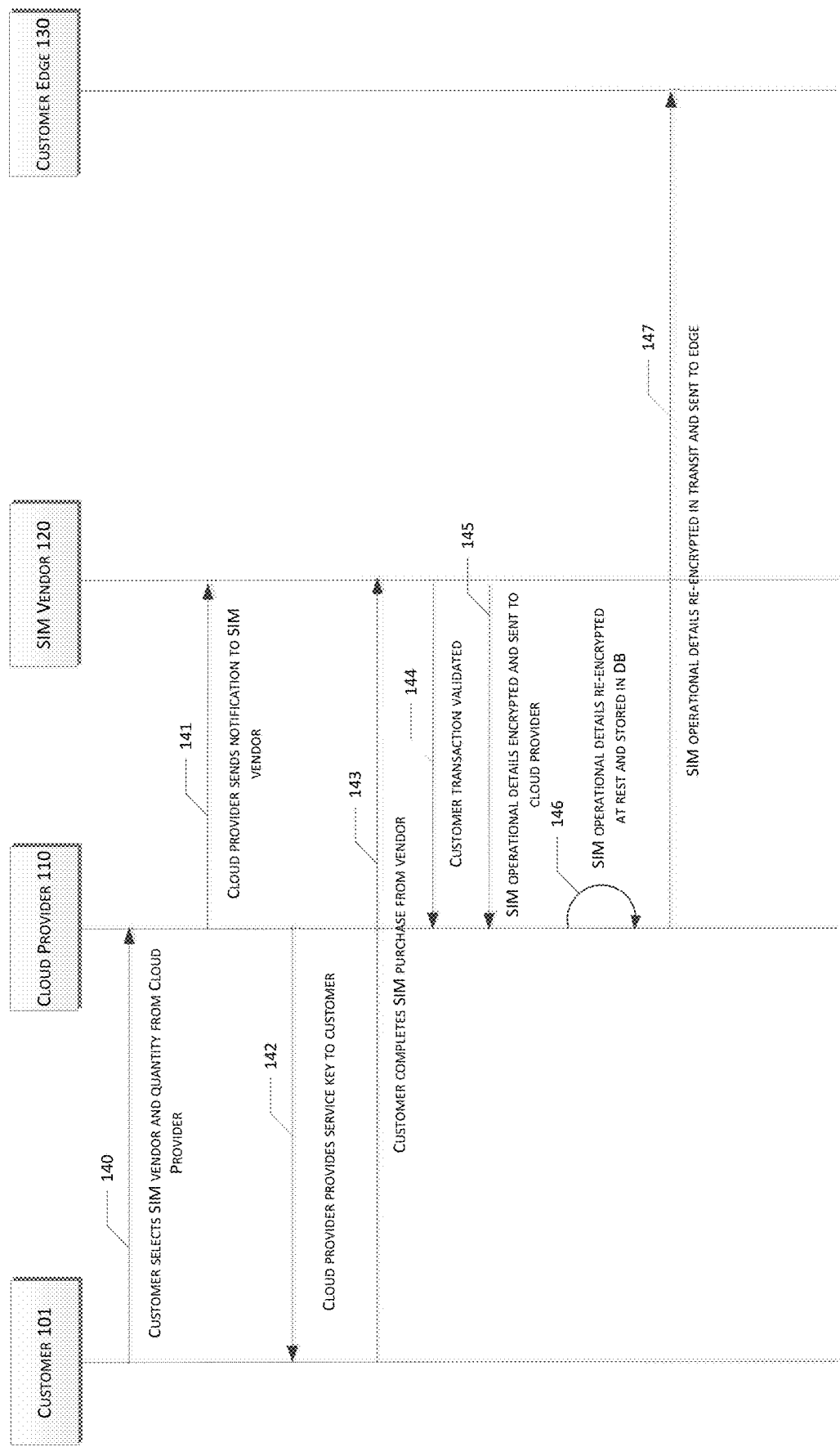
FIG. 1 depicts an example flow illustrating an embodiment of the disclosure.

Communications devices typically require credentials that securely and uniquely identify a subscription or account to enable a communications device to access and use services on a network. Such communications devices may include mobile phones, IoT devices, PCs, or any other device that has a secure container for storing the credentials which may generally be referred to as a subscriber identification module (SIM). Such a device typically ships without SIM data and must be provided with valid SIM data in order to access an appropriate network.

A device that is capable of communicating on a mobile network but is not yet provisioned to do so typically obtains its provisioning information by obtaining information that describes the credentials to be provisioned, such as the activation code for an eSIM profile. Typical eSIM specifications define multiple ways for a device to determine this provisioning information. In some cases, the information may be provided from the operator to the user of the device, who then inputs it (e.g., scanning a QR code containing the information). In another example, the device may determine the provisioning information using a global discovery server (e.g., the SM-DS) which may also be referred to as a discovery server. The device finds the eSIM download server (e.g., the SM-DP+) it needs to contact in order to provision its eSIM, and to communicate with that server. The eSIM download server may also be referred to as the eSIM server or download server.

A mobile operator can request that an eSIM profile be associated with a specific eUICC card. Every card has a permanent unique identifier called the eUICC ID (EID). The EID is disclosed to the end user through various means including the device interface. The end user may share the EID with the mobile operator when ordering a new subscription and associated eSIM profile. When the end user shares the EID with the mobile operator, the operator can link the profile to the EID. The eSIM download procedure performs mutual authentication of the eUICC card and the download server. The card may authenticate the download server, and if this is successful, the download server may authenticate the card.

However, large scale deployment and provisioning of such devices may be difficult and complex to implement. For example, an enterprise may wish to deploy a private network with a large number of enterprise-provided communications devices at an enterprise site that communicate over a 5G network. In order to provide the desired connectivity, each of the devices must be securely provisioned with a SIM profile using provider-specific processes of the 5G service provider in order to access the 5G network. Furthermore, SIM data for the SIM profiles must be securely received from the SIM provider and securely stored and managed at the location of deployment. This may be a cumbersome and complex process that can greatly increase the cost and complexity of deployment.

The present disclosure provides a way for a cloud service provider to facilitate the secure acquisition, deployment, and management of SIM data for customers of the cloud service provider, in particular for delivering SIM data to 5G MEC devices. In various embodiments, systems are described that provide secure transfer of SIM keys (e.g., Ki and OPc) between a cloud service provider and the customer's edge site. Ki is a unique cryptographic key associated with a SIM of a device, and OPc is the derived operator code unique for each SIM.

Systems are also described that provide secure storage of the SIM keys at the cloud service provider region, as well as systems that provide secure storage of the SIM keys at the customer's edge (on premises).

In one example, an encrypted flow of SIM data between cloud service provider regions and the edge can allow an enterprise customer to efficiently deploy a private network in an industrial complex at the customer site. The customer site connects a plurality of IoT devices that have installed SIM cards and where the associated profiles are under the management and control of the customer and facilitated by the cloud service provider. An infrastructure layer is provided for the edge communication stack at the customer site that enables encrypted flow of SIM data via a 5G private MEC. The customer site can include RAN units that connect the customer's devices to the 5G private MEC. The cloud service provider network enables encrypted flow of SIM data between regions and the private MEC and provides secure storage of the SIM data at these sites.

FIG. 1 illustrates an example workflow according to one embodiment. In an embodiment, an enterprise customer 101 can select 140 a SIM vendor 120 to order a quantity of SIM profiles. The quantity of SIM profiles may be ordered from the cloud provider 110. The cloud service provider 110 may send 141 a notification of the order to the SIM vendor 120 and receive the SIM data on an encrypted channel. The cloud service provider 110 may provide 142 a service key to the enterprise customer 101. The enterprise customer 101 may complete 143 the SIM purchase from the SIM vendor 120.

In operation 144, the customer transaction may be validated. SIM operational details may be encrypted 145 and sent to the cloud service provider 110. The SIM operational details may be re-encrypted 146 and securely stored. In an embodiment, the re-encrypted operational details may be stored in a database. The cloud service provider 110 may re-encrypt 147 the operational details in transit and send the re-encrypted operational details to the customer edge 130. In an embodiment, the re-encrypted operational details may be sent to the packet core at the customer edge 130.

In an example, customer-managed keys and service-managed keys may be used to encrypt the SIM data. When secure transfer is required, a call to a representational state transfer (REST) API operation is made over HTTPS. The cloud service provider 110 may send the encrypted SIM data to a database service using a service-managed key and a customer master key (CMK). The SIM data may be Transport Layer Security (TLS) encrypted in transit to the database service. TLS may also be used for sending the SIM data to the application environment.

In one scenario, an API may be implemented to enable exchange of SIM order information and SIM data. The cloud service provider can also provide processes for managing the lifecycle and operation of the SIM data including the addition and deletion of SIM data and collection of SIM metrics. Additionally, 5G network slicing may be implemented to provide differentiation of functionality and services at the customer site. The integrity and security of the SIM data is maintained through the entire process.

In an embodiment, an interface may be implemented that is configured to allow a user of a cloud service provider to select a 5G network operator and request a quantity of SIM profiles for customer-owned devices. The interface may enable the user to monitor and manage the lifecycle and operation of the SIM profiles during deployment.

In some embodiments, the interface may facilitate a process for the acquisition, deployment, and management of SIM data for users of the cloud service provider. In an embodiment, the process may include sending, by the cloud service provider to the network operator, notification of a request for SIM profiles to the 5G network operator. The cloud service provider may receive, from the 5G network operator, the requested SIM profiles on an encrypted channel which can be only accessed by the 5G network operator The cloud service provider may provide a secure service key to the user of the cloud service. The secure service key may enable the user of the cloud service provider to complete acquisition of the SIM profiles from the 5G network operator.

The cloud service provider may securely receive and decrypt SIM data that corresponds to the SIM profiles from the 5G network operator. The cloud service provider may re-encrypt and securely store the SIM data. The cloud service provider may then send the re-encrypted SIM data to an edge site of the user.

In some embodiments, an interface may be provided for the user of the cloud service provider to manage the subscriptions for the SIM profiles on SIM-capable devices at the user site.

The techniques described herein may be implemented for devices in communication with various wireless communications systems such as CDMA, TDMA, FDMA, OFDMA, and SC-FDMA. A CDMA system may implement a radio technology such as CDMA2000, Universal Terrestrial Radio Access (UTRA), etc. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDMA, etc. The techniques described herein may be used for the systems and radio technologies mentioned above as well as other systems and radio technologies. The description below, however, describes a cellular system for purposes of example, although the techniques are applicable beyond cellular applications.

Figure 2:
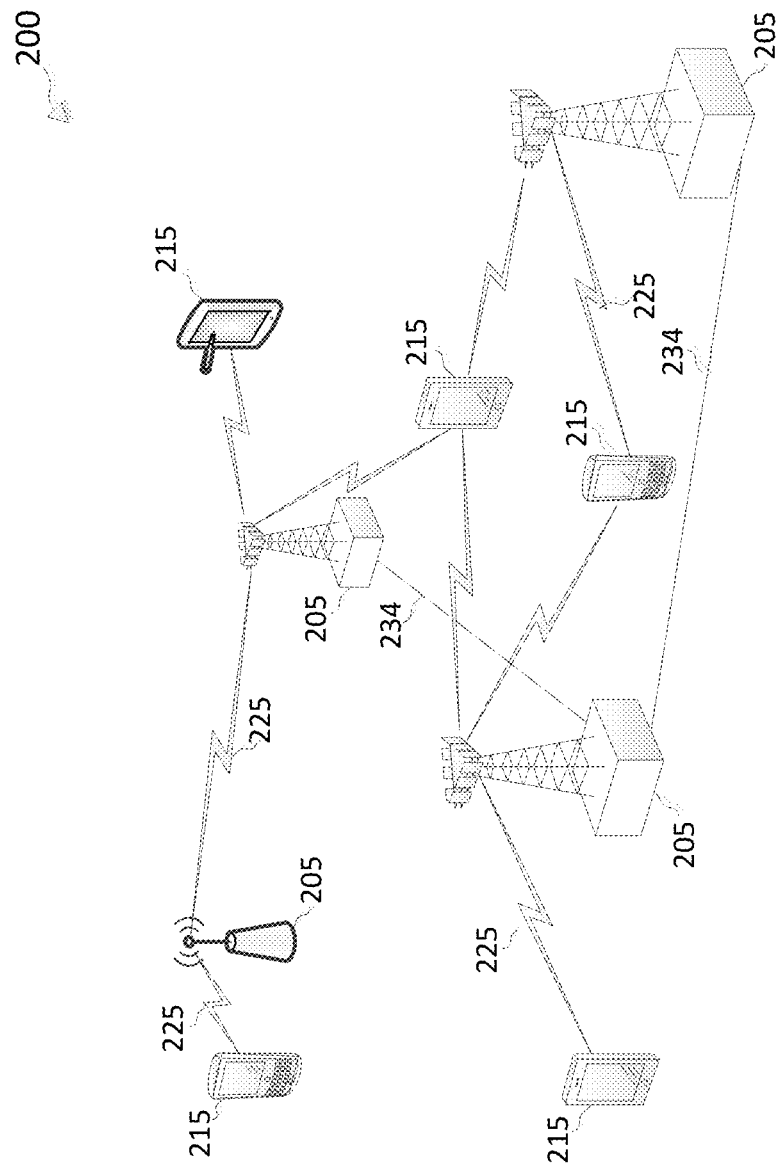
FIG. 2 depicts an example of a networked environment where aspects of the disclosure may be implemented.

FIG. 2 is a block diagram conceptually illustrating an example of a wireless communications system 200, in accordance with an aspect of the present disclosure. The wireless communications system 200 includes base stations (or cells) 205 and mobile devices 215. The base stations 205 may communicate with the mobile devices 215 under the control of a base station controller (not shown), which may be part of a core network or the base stations 205. The wireless communications system 200 may support operation on multiple carriers. Multi-carrier transmitters can transmit modulated signals simultaneously on the multiple carriers. For example, each communication link 225 may be a multi-carrier signal modulated according to the various radio technologies described above.

The base stations 205 may wirelessly communicate with the mobile devices 215 via one or more base station antennas. The base stations 205 sites may provide communication coverage for respective coverage areas. The mobile devices 215 may be located throughout the wireless communications system 200 and may be stationary or mobile. A mobile device 215 may also be referred to as user equipment (UE), mobile station, a mobile unit, a subscriber unit, remote unit, a mobile device, a wireless communications device, a remote device, a mobile terminal, a wireless terminal, a handset, a mobile client, a client, or other suitable terminology. A mobile device 215 may be a cellular phone, a wireless modem, a wireless communication device, a handheld device, a tablet computer, a laptop computer, or the like. The communication links 225 shown in the wireless communications system 200 may include uplink (UL) transmissions from a mobile device 215 to a base station 205, and/or downlink (DL) transmissions, from a base station 205 to a mobile device 215.

Figure 3:
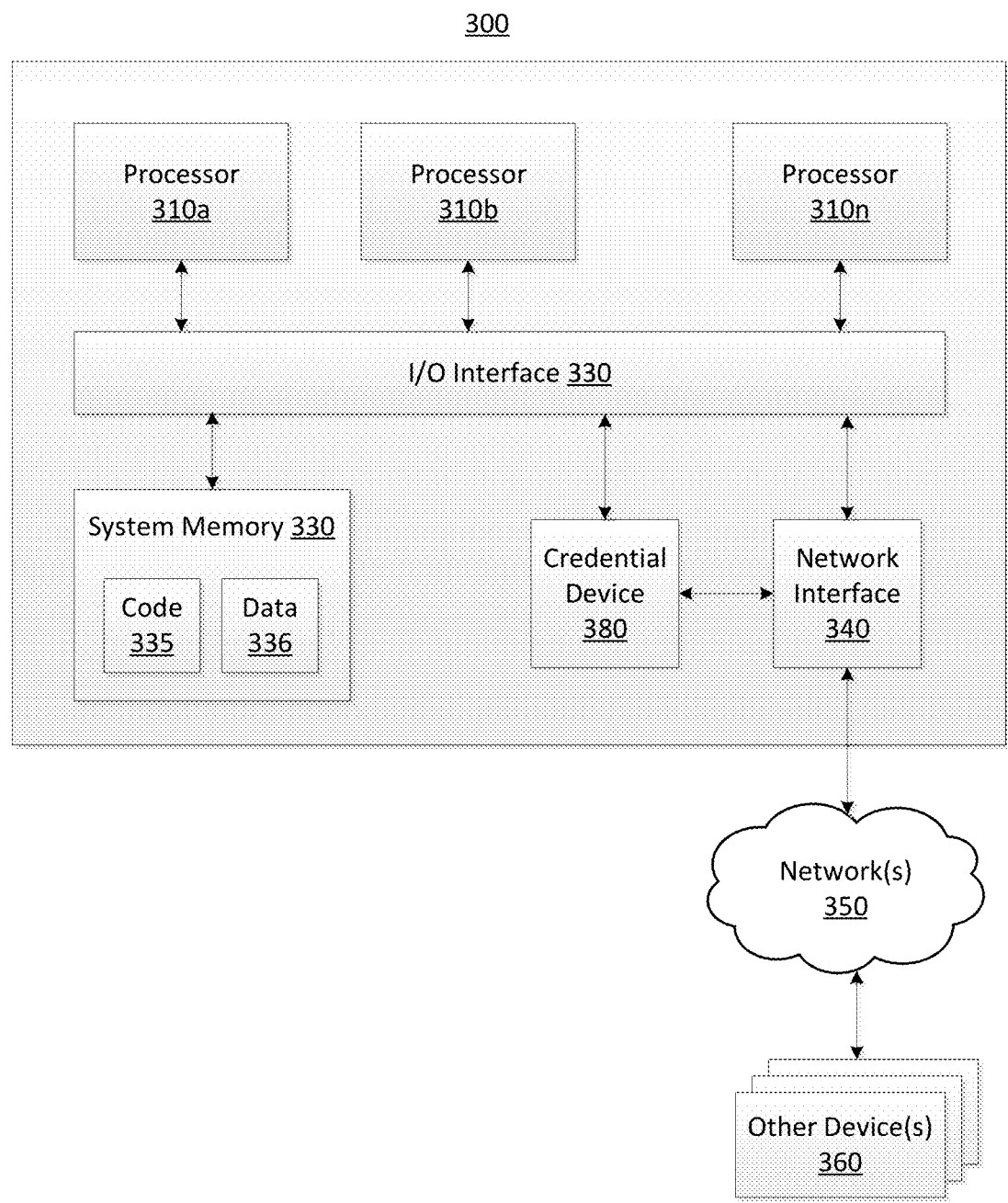
FIG. 3 depicts an example of a computing device where aspects of the disclosure may be implemented.

In at least some embodiments, a computing device that implements a portion or all of one or more of the technologies described herein may include a general-purpose computer system that includes or is configured to access one or more computer-accessible media. FIG. 3 illustrates such a general-purpose computing device 300. In the illustrated embodiment, computing device 300 includes one or more processors 310a, 310b, and/or 310n (which may be referred herein singularly as "a processor 310" or in the plural as "the processors 310") coupled to a system memory 330 via an input/output (I/O) interface 330. Computing device 300 further includes a network interface 340 coupled to I/O interface 330.

In various embodiments, computing device 300 may be a uniprocessor system including one processor 310 or a multiprocessor system including several processors 310 (e.g., two, four, eight, or another suitable number). Processors 310 may be any suitable processors capable of executing instructions. For example, in various embodiments, processors 310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 310 may commonly, but not necessarily, implement the same ISA.

System memory 330 may be configured to store instructions and data accessible by processor(s) 310. In various embodiments, system memory 330 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 330 as code 335 and data 336.

In one embodiment, I/O interface 330 may be configured to coordinate I/O traffic between processor 310, system memory 330, and any peripheral devices in the device, including network interface 340 or other peripheral interfaces. In some embodiments, I/O interface 330 may perform any necessary protocol, timing, or other data transformations to convert data signals from one component (e.g., system memory 330) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 330, may be incorporated directly into processor 310.

Network interface 340 may be configured to allow data to be exchanged between computing device 300 and other device or devices 360 attached to a network or network(s) 350, such as other computer systems or devices as illustrated herein, for example. In various embodiments, network interface 340 may support communication via any suitable wired or wireless general data networks, such as types of Ethernet networks, for example. Additionally, network interface 340 may support communication via telecommunications/telephony networks such as analog voice networks or digital fiber communications networks, via storage area networks such as Fibre Channel SANs, cellular voice and/or data networks, or via any other suitable type of network and/or protocol. When a network interface 340 provides cellular communication, its operation may be supported by a credential device 380 that may provide authentication, authorization, and other related information and services.

In some embodiments, system memory 330 may be one embodiment of a computer-accessible medium configured to store program instructions and data as described herein for FIGS. 1-7 for implementing embodiments of the corresponding methods and systems. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 300 via I/O interface 330. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 300 as system memory 330 or another type of memory. Portions or all of multiple computing devices, such as those illustrated in FIG. 3, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices. For purposes of this specification and the claims, the phrase "computer-readable storage medium" and variations thereof, does not include waves, signals, and/or other transitory and/or intangible communication media.

Figure 4:
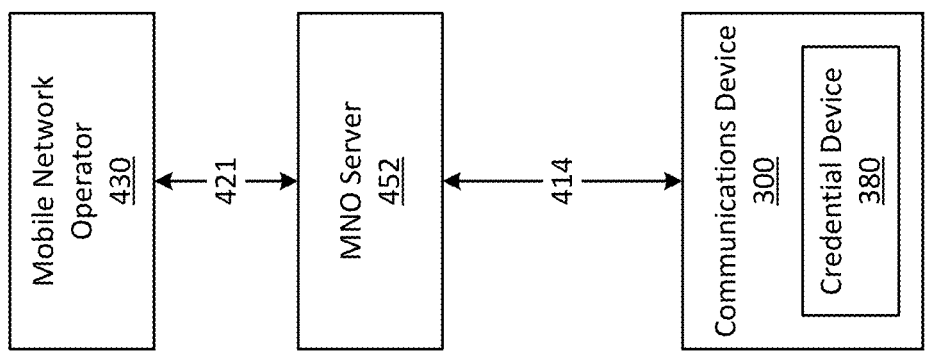
FIG. 4 depicts an example environment for provisioning of mobile devices.

The communications devices as used herein may refer to devices including, but not limited to, smartphones, cellular-enabled tablets and laptops, companion devices (e.g., smart watches), and non-consumer devices (telematics device in an automobile, cellular-connected utility meters, any of which may include some number of credential device(s) 380), and the like. With reference to FIG. 4, credential device 380 such as a UICC or eUICC may be included in the communications device 300 to ensure the integrity and security of personal data and enables communications with mobile communications providers. Such a communications device 300 may embody aspects of the computing device depicted in FIG. 2, and in some embodiments may incorporate one or more network interfaces 240 that communicates over a cellular network.

For communications devices complying with various specifications such as 5G specifications, their associated credentials are typically embedded in a SIM card. A SIM card may be a removable physical smart card conforming to UICC specification ETSI TS 102 221. The SIM card may be installed when the communications device is manufactured or at the point of sale. Alternatively, a SIM card may be purchased from the mobile operator for use with a communications device that is obtained separately and that has a physical slot conforming to the UICC specification.

Credentials for accessing a communications service provided by MNO 430 may include both data and instructions. When the instructions are executed on a processor, such as the processor of credential device 380 within a mobile communications device 300, the instructions may be configured to cause communication between the processor and a communications service server such that the communications service server may authenticate the credentials and enable the communications services. A set of credentials may be associated with a subscription for communications services from a particular communication service provider. Multiple sets of credentials may be provided for multiple subscriptions.

An eUICC may enable the service subscription used by the communications device to be securely reconfigured without physically adding or removing the eUICC from the communications device. An eUICC may hold one or multiple eUICC profiles, with one being typically active at one time. An eUICC profile, as used herein, generally refers to the client information associated with a network subscription, and embodiments are not limited to any particular eUICC system. A eUICC profile, may include a combination of file structure, data, and applications associated with the service credentials provisioned onto a credential device and which enable the communications device to use the subscription services associated with that profile.

FIG. 4 depicts one example environment for provisioning of profiles. A MNO 430 may own or otherwise control one or more MNO servers 452 through an interface 421. MNO servers may include an SM-DP+. A communications device, also known as User Equipment (UE) 300 may, for example, be a mobile communications device containing a credential device 380. The credential device 380 may refer to a physically removable device containing electronic credentials, such as a removable eUICC, or a non-removable device that can be electronically provisioned with subscription credentials, such as a soldered eUICC, or the like. The credential device 380 may also refer to a software container that can contain one or more e-profiles and that can be electronically provisioned with subscription credentials in accordance with some embodiments.

Once provisioned with credentials on a credential device 380, UE 300 may be configured to use the provisioned credentials to access MNO subscription services via network connection 414. Network connection 414 may also enable UE 300 to access enterprise services or resources. Network connection 414 may be any type of computer network connection, including wired, WiFi, a cellular data connection, and the like.

In some embodiments, the credential device 380 may be a removable or non-removable eUICC which may be provided by MNO 430 or other manufacturer.

When the profile download is requested, a connection between the download server and the eUICC may be strongly authenticated, such as using a Transport Layer Security (TLS) channel. The eUICC may send the EID to the download server over the authenticated channel. In order to enable download of the correct profile to the eUICC, the activation code for the download request from the mobile operator can be linked to a particular EID. If the profile was pre-arranged by the mobile operator and the device has or can obtain the address of the download server, then the activation code may not be sent to the mobile device. By transmitting the hash value, transmission of the EID between the eUICC and the mobile operator and between the mobile operator and the download server can be avoided. In other words, the derived hash value may be associated with the profile download order instead of the actual EID.

Figure 5:
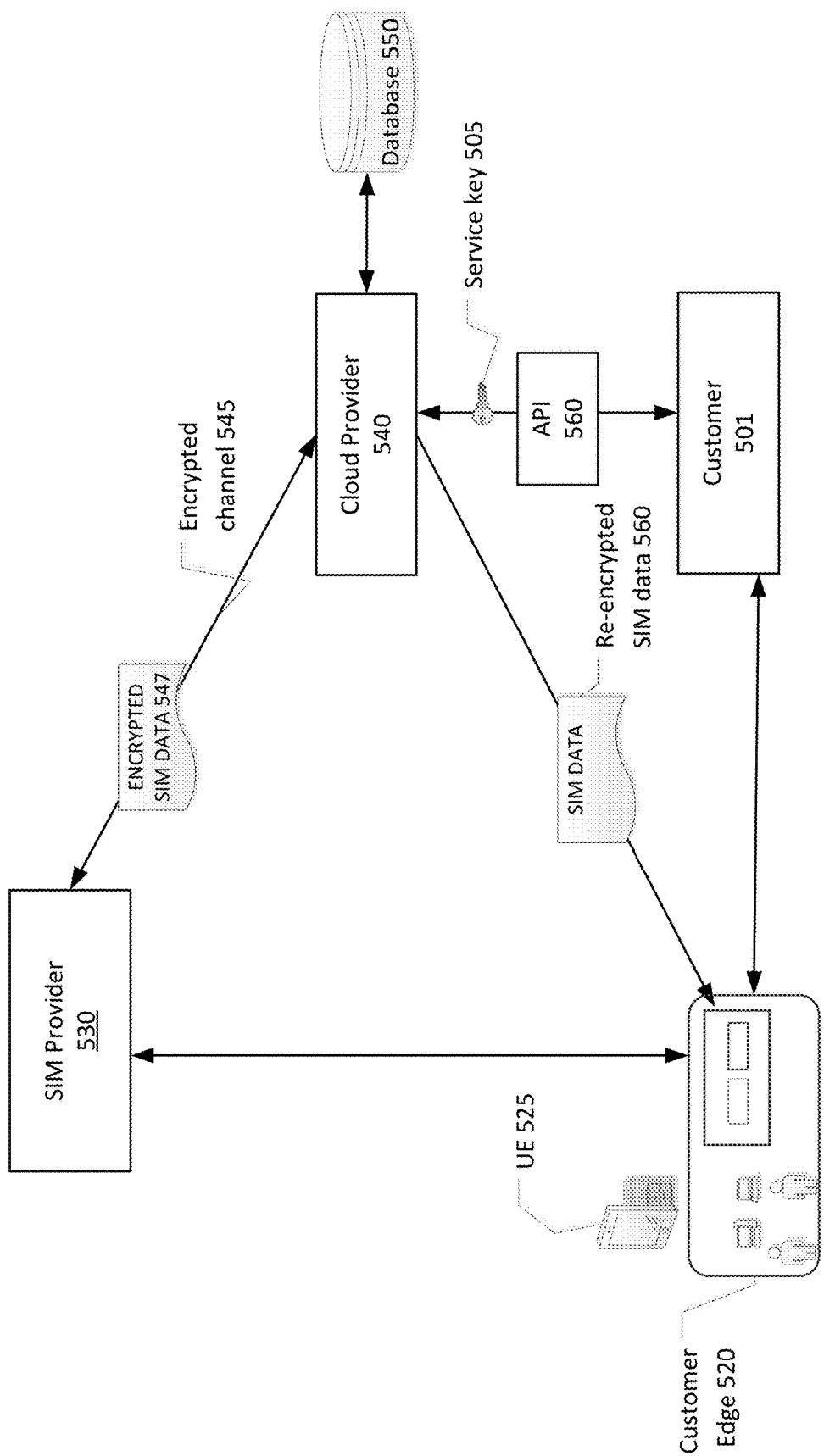
FIG. 5 depicts an example system for provisioning of mobile devices.

Referring to FIG. 5, illustrated is an example implementation of the present disclosure. In an embodiment, an enterprise customer 501 may use an API 560 to select SIM provider 530 to order a quantity of SIM profiles. The quantity of SIM profiles may be ordered via the cloud provider 540. The cloud service provider 540 may send a notification of the order to the SIM provider 530 and receive the SIM data on an encrypted channel 545. The cloud provider 540 may provide a service key 505 to the enterprise customer 501. The enterprise customer 501 may complete the SIM purchase from the SIM provider 530.

The SIM provider 530 may validate the customer transaction. The SIM provider 530 may encrypt the SIM operational details and the encrypted SIM operational details to the cloud service provider 540. The cloud service provider 540 may re-encrypt the SIM operational details and securely store the re-encrypted SIM operational details in a database 550. The cloud provider 540 may re-encrypt the operational details in transit and send the re-encrypted operational details to the customer edge 520. In an embodiment, the re-encrypted operational details may be sent to the packet core at the customer edge 520. The operational details may be used to provision UE 525 at the customer edge 520.

In an embodiment, API 560 may enable exchange of SIM order information and SIM data. The cloud provider 540 can also provide processes for managing the lifecycle and operation of the SIM data including the addition and deletion of SIM data and collection of SIM metrics.

Figure 6:
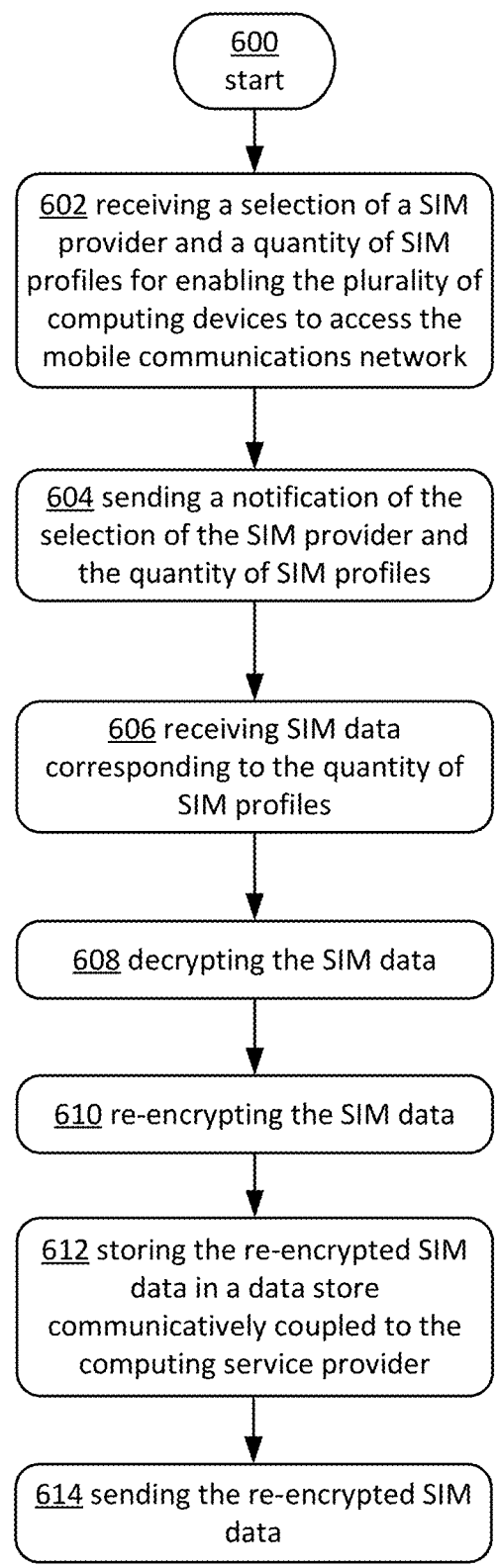
FIG. 6 depicts an operational procedure for provisioning of mobile devices.

FIG. 6 illustrates an example operational procedure for one embodiment of provisioning a plurality of computing devices in accordance with this disclosure. In an embodiment, the plurality of computing devices are configured to communicate on a mobile communications network operated, in part, by an edge computing network associated with a customer of a computing service provider. In an embodiment, the edge computing network comprises computing and storage devices configured to extend computing resources of the computing service provider to the customer of the computing service provider. The computing devices and systems may have a memory that has stored thereon computer-executable instructions that, when executed, cause the computing device to perform operations as described.

Referring to FIG. 6, operation 600 begins the operational procedure. Operation 600 may be followed by operation 602. Operation 602 illustrates receiving, by the computing service provider from the customer of the computing service provider, a selection of a SIM provider and a quantity of SIM profiles for enabling the plurality of computing devices to access the mobile communications network.

Operation 602 may be followed by operation 604. Operation 604 illustrates sending, by the computing service provider to the SIM provider, a notification of the selection of the SIM provider and the quantity of SIM profiles.

Operation 604 may be followed by operation 606. Operation 606 illustrates receiving, by the computing service provider from the SIM provider, SIM data corresponding to the quantity of SIM profiles. In an embodiment, the SIM data is encrypted and received over an encrypted channel.

Operation 606 may be followed by operation 608. Operation 608 illustrates decrypting, by the computing service provider, the SIM data using a first set of decryption credentials.

Operation 608 may be followed by operation 610. Operation 610 illustrates re-encrypting, by the computing service provider, the SIM data using a second set of encryption credentials. In an embodiment, decryption credentials for the re-encrypted SIM data are stored at the edge computing network.

Operation 610 may be followed by operation 612. Operation 612 illustrates storing the re-encrypted SIM data in a data store communicatively coupled to the computing service provider to maintain a secure copy of the re-encrypted SIM data at the computing service provider.

Operation 612 may be followed by operation 614. Operation 614 illustrates sending, by the computing service provider to the edge computing network, the re-encrypted SIM data. In an embodiment, the re-encrypted SIM data is operable to be decrypted by the edge computing network using the decryption credentials managed by the computing service provider. In an embodiment, the decrypted SIM data is usable as subscription credentials for accessing the mobile communications network by the plurality of computing devices using the quantity of SIM profiles.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present disclosure may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

The disclosure presented herein also encompasses the subject matter set forth in the following clauses:

Clause 1: A method of provisioning a plurality of computing devices configured to communicate on a mobile communications network operated, in part, by an edge computing network associated with a customer of a computing service provider, the edge computing network comprising computing and storage devices configured to extend computing resources of the computing service provider to the customer of the computing service provider, the method comprising:
  receiving, by the computing service provider from the customer of the computing service provider, a selection of a SIM provider and a quantity of SIM profiles for enabling the plurality of computing devices to access the mobile communications network;
  sending, by the computing service provider to the SIM provider, a notification of the selection of the SIM provider and the quantity of SIM profiles;
  receiving, by the computing service provider from the SIM provider, SIM data corresponding to the quantity of SIM profiles, wherein the SIM data is encrypted and received over an encrypted channel;
  decrypting, by the computing service provider, the SIM data using a first set of decryption credentials;
  re-encrypting, by the computing service provider, the SIM data using a second set of encryption credentials, wherein decryption credentials for the re-encrypted SIM data are stored at the edge computing network;
  storing the re-encrypted SIM data in a data store communicatively coupled to the computing service provider to maintain a secure copy of the re-encrypted SIM data at the computing service provider; and
  sending, by the computing service provider to the edge computing network, the re-encrypted SIM data, wherein the re-encrypted SIM data is operable to be decrypted by the edge computing network using the decryption credentials managed by the computing service provider, and wherein the decrypted SIM data is usable as subscription credentials for accessing the mobile communications network by the plurality of computing devices using the quantity of SIM profiles. wherein the SIM data comprises Ki and OPc keys.

Clause 2: The method of clause 1, wherein the SIM data comprises Ki and OPc keys.

Clause 3: The method of any of clauses 1-2, further comprising sending, by the computing service provider to the customer of the computing service provider, a service key in response to receiving an order for the quantity of SIM profiles.

Clause 4: The method of any of clauses 1-3, wherein the service key is usable to complete a purchase of the quantity of SIM profiles by the customer of the computing service provider.

Clause 5: The method of any of clauses 1-4, wherein the SIM data corresponding to the quantity of SIM profiles is received by the computing service provider from the SIM provider in response to validation of a transaction for a purchase of the quantity of SIM profiles by the customer of the computing service provider.

Clause 6: The method of any of clauses 1-5, wherein customer-managed keys and service-managed keys are used to re-encrypt the SIM data.

Clause 7: The method of any of clauses 1-6, further comprising implementing, by the computing service provider, an API operable to receive the selection of the SIM provider and the quantity of SIM profiles.

Clause 8: A system comprising:
  a memory storing thereon instructions that when executed by a processor of the system, cause the system to perform operations comprising:
    receiving a user selection of a SIM provider and a quantity of SIM profiles for enabling a plurality of computing devices to access a mobile communications network;
    sending, to the SIM provider, a notification of the selection of the SIM provider and the quantity of SIM profiles;
    receiving, from the SIM provider, SIM data corresponding to the quantity of SIM profiles, wherein the SIM data is encrypted and received over an encrypted channel;
    decrypting the SIM data using a first set of decryption credentials;
    re-encrypting the SIM data using a second set of encryption credentials, wherein decryption credentials for the re-encrypted SIM data are stored at the edge computing network;
    storing the re-encrypted SIM data in a data store communicatively coupled to the system to maintain a secure copy of the re-encrypted SIM data; and
    sending, to an edge computing network associated with a customer of a computing service provider, the re-encrypted SIM data, wherein the re-encrypted SIM data are operable to be decrypted by the edge computing network using the decryption credentials, and wherein the decrypted SIM data are usable as subscription credentials for accessing the mobile communications network by the plurality of computing devices using the quantity of SIM profiles.

Clause 9: The edge computing network of clause 8, wherein the SIM data comprises Ki and OPc keys.

Clause 10: The edge computing network of any of clauses 8 and 9, further comprising sending, by the computing service provider to the customer of the computing service provider, a service key in response to receiving an order for the quantity of SIM profiles.

Clause 11: The edge computing network of any of clauses 8-10, wherein the service key is usable to complete a purchase of the quantity of SIM profiles by the customer of the computing service provider.

Clause 12: The edge computing network of any of clauses 8-11, wherein the SIM data corresponding to the quantity of SIM profiles is received by the computing service provider from the SIM provider in response to validation of a transaction for a purchase of the quantity of SIM profiles by the customer of the computing service provider.

Clause 13: The edge computing network of any of clauses 8-12, wherein customer-managed keys and service-managed keys are used to re-encrypt the SIM data.

Clause 14: The edge computing network of any of clauses 8-13, further comprising implementing, by the computing service provider, an API operable to receive the selection of the SIM provider and the quantity of SIM profiles.

Clause 15: A computer-readable storage medium having computer-executable instructions stored thereupon which, when executed by one or more processors of a computing device, cause the computing device to:
receiving, from a user of a computing service provider, a selection of a SIM provider and a quantity of SIM profiles for enabling a plurality of computing devices to access a mobile communications network;
sending, to the SIM provider, a notification of the selection of the SIM provider and the quantity of SIM profiles;
receiving, from the SIM provider, SIM data corresponding to the quantity of SIM profiles, wherein the SIM data is encrypted and received over an encrypted channel;
decrypting the SIM data;
re-encrypting the SIM data;
storing the re-encrypted SIM data in a data store communicatively coupled to the computing device; and
sending, to edge computing network associated with a customer of a computing service provider, the re-encrypted SIM data;
wherein the re-encrypted SIM data are usable as subscription credentials for accessing the mobile communications network by the plurality of computing devices.

Clause 16: The computer-readable storage medium of clause 15, wherein the SIM data comprises Ki and OPc keys.

Clause 17: The computer-readable storage medium of any of clauses 15 and 16, further comprising sending, by the computing service provider to the customer of the computing service provider, a service key in response to receiving an order for the quantity of SIM profiles.

Clause 18: The computer-readable storage medium of any of the clauses 15-17, wherein the service key is usable to complete a purchase of the quantity of SIM profiles by the customer of the computing service provider.

Clause 19: The computer-readable storage medium of any of the clauses 15-18, wherein the SIM data corresponding to the quantity of SIM profiles is received by the computing service provider from the SIM provider in response to validation of a transaction for a purchase of the quantity of SIM profiles by the customer of the computing service provider.

Clause 20: The computer-readable storage medium of any of the clauses 15-19, further comprising implementing, by the computing service provider, an API operable to receive the selection of the SIM provider and the quantity of SIM profiles.

What is claimed is:

1. A method of provisioning a plurality of computing devices configured to communicate on a mobile communications network operated, in part, by an edge computing network associated with a customer of a computing service provider, the edge computing network comprising computing and storage devices configured to extend computing resources of the computing service provider to the customer of the computing service provider, the method comprising:
receiving, by the computing service provider, encrypted SIM data corresponding to a plurality of SIM profiles for enabling the plurality of computing devices to access the mobile communications network;
decrypting, by the computing service provider, the SIM data using a first set of decryption credentials;
re-encrypting, by the computing service provider, the SIM data using a second set of encryption credentials, wherein decryption credentials for the re-encrypted SIM data are stored at the edge computing network;
storing the re-encrypted SIM data in a data store communicatively coupled to the computing service provider to maintain a secure copy of the re-encrypted SIM data at the computing service provider; and
sending, by the computing service provider to the edge computing network, the re-encrypted SIM data, wherein the re-encrypted SIM data is operable to be decrypted by the edge computing network using the decryption credentials managed by the computing service provider, and wherein the decrypted SIM data is usable as subscription credentials for accessing the mobile communications network by the plurality of computing devices using the plurality of SIM profiles.

2. The method of claim 1, wherein the SIM data comprises Ki and OPc keys.

3. The method of claim 1, further comprising sending, by the computing service provider to the customer of the computing service provider, a service key in response to receiving an order for the plurality of SIM profiles.

4. The method of claim 3, wherein the service key is usable to complete a purchase of the plurality of SIM profiles by the customer of the computing service provider.

5. The method of claim 1, wherein the SIM data corresponding to the plurality of SIM profiles is received by the computing service provider from a SIM provider in response to validation of a transaction for a purchase of the plurality of SIM profiles by the customer of the computing service provider.

6. The method of claim 1, wherein customer-managed keys and service-managed keys are used to re-encrypt the SIM data.

7. The method of claim 1, further comprising implementing, by the computing service provider, an API operable to receive a selection of a SIM provider and the plurality of SIM profiles.

8. A system comprising:
a memory storing thereon instructions that when executed by a processor of the system, cause the system to perform operations comprising:

receiving encrypted SIM data corresponding to a plurality of SIM profiles for enabling a plurality of computing devices to access a mobile communications network;

decrypting the SIM data using a first set of decryption credentials;

re-encrypting the SIM data using a second set of encryption credentials, wherein decryption credentials for the re-encrypted SIM data are stored at an edge computing network associated with a customer of a computing service provider;

storing the re-encrypted SIM data in a data store communicatively coupled to the system to maintain a secure copy of the re-encrypted SIM data; and sending, to an edge computing network associated with the customer of the computing service provider, the re-encrypted SIM data, wherein the re-encrypted SIM data are operable to be decrypted by the edge computing network using the decryption credentials, and wherein the decrypted SIM data are usable as subscription credentials for accessing the mobile communications network by the plurality of computing devices using the plurality of SIM profiles.

9. The system of claim 8, wherein the SIM data comprises Ki and OPc keys.

10. The system of claim 8, further comprising sending, by the computing service provider to the customer of the computing service provider, a service key in response to receiving an order for the plurality of SIM profiles.

11. The system of claim 10, wherein the service key is usable to complete a purchase of the plurality of SIM profiles by the customer of the computing service provider.

12. The system of claim 8, wherein the SIM data corresponding to the plurality of SIM profiles is received by the computing service provider from a SIM provider in response to validation of a transaction for a purchase of the plurality of SIM profiles by the customer of the computing service provider.

13. The system of claim 8, wherein customer-managed keys and service-managed keys are used to re-encrypt the SIM data.

14. The system of claim 8, further comprising implementing, by the computing service provider, an API operable to receive a selection of a SIM provider and the plurality of SIM profiles.

15. A computer-readable storage medium having computer-executable instructions stored thereupon which, when executed by one or more processors of a computing device, cause the to perform operations comprising:

receiving encrypted SIM data corresponding to a plurality of SIM profiles for enabling a plurality of computing devices to access a mobile communications network;

decrypting the SIM data;

re-encrypting the SIM data;

storing the re-encrypted SIM data in a data store communicatively coupled to the computing device; and sending, to an edge computing network associated with a customer of a computing service provider, the re-encrypted SIM data;

wherein the re-encrypted SIM data are usable as subscription credentials for accessing the mobile communications network by the plurality of computing devices.

16. The computer-readable storage medium of claim 15, wherein the SIM data comprises Ki and OPc keys.

17. The computer-readable storage medium of claim 15, further comprising sending, to the customer of a computing service provider, a service key in response to receiving an order for the plurality of SIM profiles.

18. The computer-readable storage medium of claim 17, wherein the service key is usable to complete a purchase of the plurality of SIM profiles by the customer of the computing service provider.

19. The computer-readable storage medium of claim 15, wherein the SIM data corresponding to the plurality of SIM profiles is received from a SIM provider in response to validation of a transaction for a purchase of the plurality of SIM profiles.

20. The computer-readable storage medium of claim 15, further comprising implementing, by a computing service provider, an API operable to receive a selection of a SIM provider and the plurality of SIM profiles.

* * * * *